Nov. 19, 1968   W. W. ZENGEL   3,411,703
CONTROL MEANS FOR ENGINE DRIVEN SYSTEMS AND THE LIKE
Filed Dec. 23, 1966

INVENTOR:
WAYNE W. ZENGEL
BY
Charles B. Haverstock
ATTORNEY,

United States Patent Office 3,411,703
Patented Nov. 19, 1968

3,411,703
CONTROL MEANS FOR ENGINE DRIVEN SYSTEMS AND THE LIKE
Wayne W. Zengel, Jefferson County, Mo.
(88 Delores Drive, Fenton, Mo. 63026)
Filed Dec. 23, 1966, Ser. No. 604,291
15 Claims. (Cl. 230—15)

ABSTRACT OF THE DISCLOSURE

Means for controlling the engagement of engine driven systems such as engine driven air conditioning systems and the like including valve means for controlling communication between a source of engine pressure and the means for engaging the air conditioning system to the engine, said valve means being movable between two self-maintainable operating positions one of which establishes communication between the source of engine pressure and the system engine engaging means and the other preventing said communication and relieving pressure that may be present at the system engaging means, said valve means requiring small amounts of operating power only at times when moving between its operating positions.

In the past, air conditioning systems such as those employed in automobiles and other engine driven vehicles and devices have been relatively inefficient, have required substantial energy to operate and have been a substantial drain on the electrical system of the vehicle particularly during on cycles. The controls for the known systems have also been relatively complicated and expensive to construct and install, and the known controls in many cases have required some modification of the existing components in the vehicle and faulty operation of these existing air conditioners often caused failure of the entire vehicle operation. The present control means and system overcome these and other shortcomings and disadvantages of the known and existing equipment and provide relatively inexpensive, easy to install means for controlling air conditioning and other equipment in an engine driven device. The present invention resides in a novel control device which is relatively inexpensive to construct and install and requires relatively little energy to operate, and the invention also resides in a novel system employing said control device. Furthermore, the present control means and system can be used with existing equipment with a minimum of modification.

A principal object of the present invention is to provide improved means for controlling air conditioning and similar equipment particularly when employed in automobiles and other engine driven vehicles and devices.

Another object is to increase the operating efficiency of automobile and other engine driven air conditioning systems and the like.

Another object is to provide control means which can be installed in automobiles and other engine driven devices with minimum modification of the existing equipment.

Another object is to reduce the electric energy required for operating air conditioning and similar equipment.

Another object is to make air conditioning available to a greater market including the small, low power vehicle market.

Another object is to provide an improved valve device for use in air conditioning systems and the like.

Another object is to improve an air conditioning system for automobiles, aircraft, boats, and other vehicles.

Figure 1:
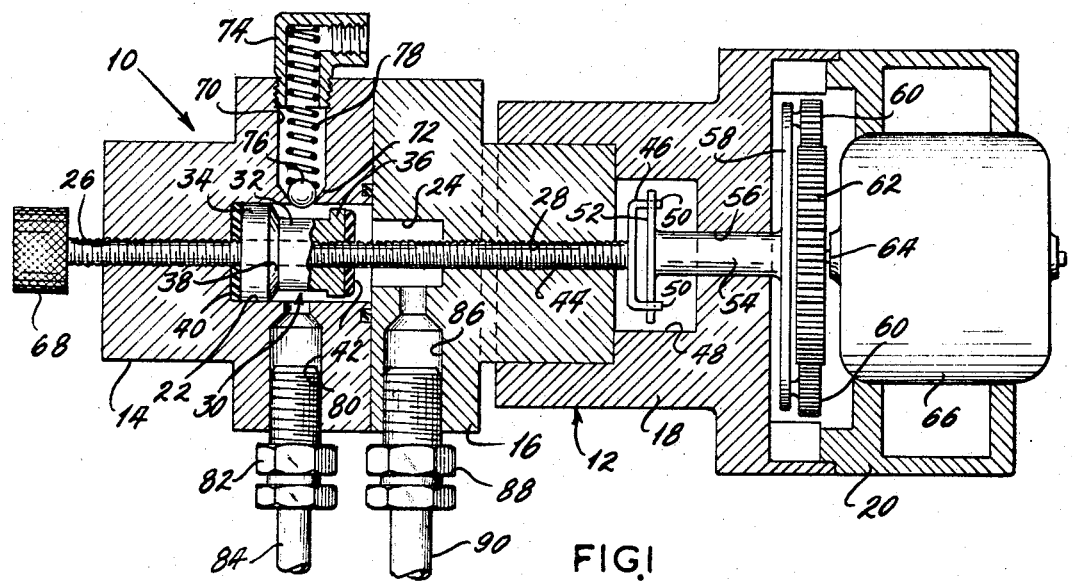
Figure 2:
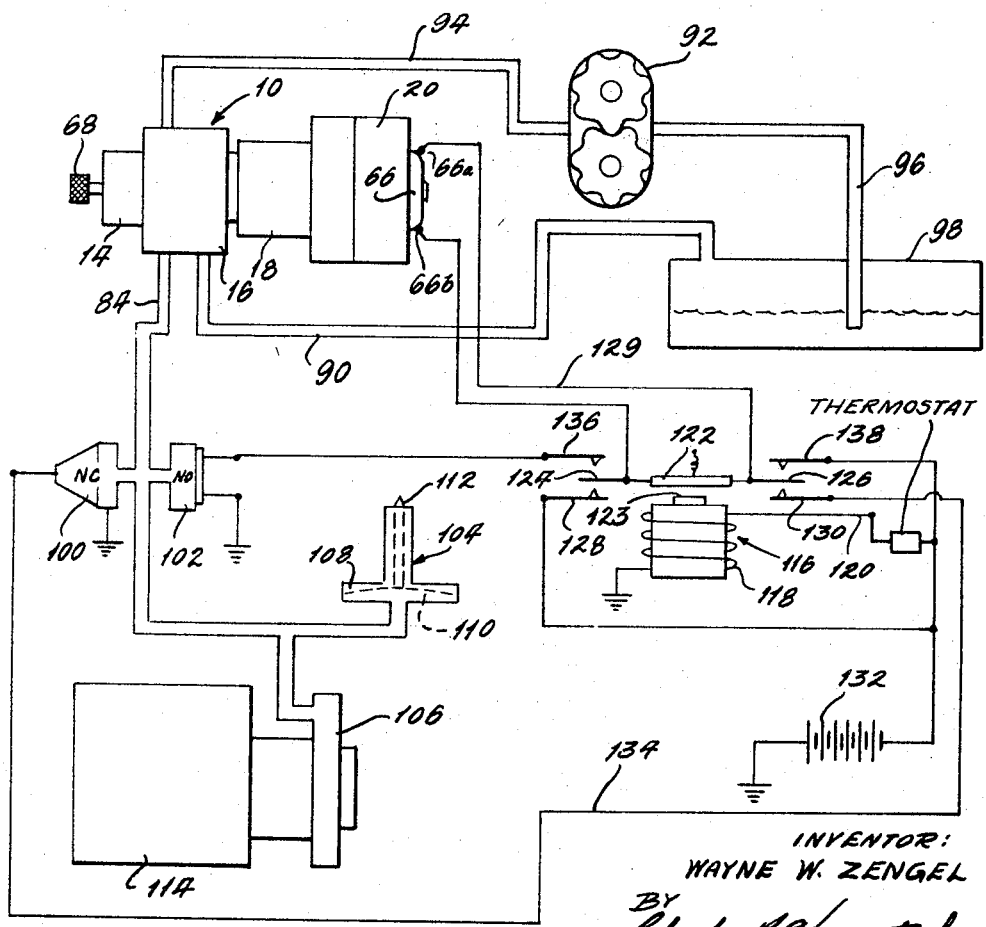

These and other objects and advantages of the invention will become apparent after considering the following detailed specification which discloses a preferred embodiment of the subject control means and system therefor in conjunction with the accompanying drawing, wherein:

FIG. 1 is a cross-sectional view through the center of a control device constructed according to the present invention; and, FIG. 2 is a schematic diagram of the controls for an automobile air conditioning system employing a control device constructed as shown in FIG. 1.

Referring to the drawings more particularly by reference numbers, number 10 refers generally to a control device constructed according to the present invention. The device 10 includes a housing 12 constructed of connected portions 14, 16, 18 and 20. The housing portions 14 and 16 have aligned communicating cylindrical chambers 22 and 24 and associated aligned threaded bores 26 and 28, respectively.

A movable valve assembly 30 is positioned in the chamber 22 and includes a cylindrical valve body 32 having integral spaced end portions 34 and 36 which are larger in diameter than the intermediate connecting body portion. The end portion 34 has an annular beveled surface 38 on one side the purpose for which will be described later. Both end portions 34 and 36 are provided with adjacent annular seals 40 and 42 positioned as shown, and the seals engage associated chamber surfaces on the housing members in the different operating positions of the movable assembly 30.

The valve assembly 30 also has a threaded shaft 44 which extends through the body 32 and is fixedly attached thereto. The shaft 44 extends through and cooperates with the threaded housing bores 26 and 28. The right end of the shaft 44 as shown in FIG. 1 is connected to the base portion of a U-shaped member 46 which is positioned in another housing chamber 48 formed between the housing portions 16 and 18. The U-shaped member 46 includes spaced endwardly extending leg portions 50 which cooperate with opposite ends of a rotatable member 52 mounted on one end of another shaft 54. The shaft 54 is rotatable in a housing bore 56 and the opposite end of the shaft 54 is connected to a carrier member 58 on which are rotatably mounted a plurality of planetary gears 60. The planetary gears 60 engage a sun gear 62 which is mounted on one end of a motor shaft 64 of reversible drive motor 66. When the motor 66 is energized by means which also control its direction of rotation, the sun gear 62 will rotate and in so doing will also rotate the planetary gears 60, the carrier 58 and the shaft 54. Rotation of the shaft 54 will rotate the member 52 causing it to move into engagement with the leg portions 50 of the U-shaped member 46 thereby causing the threaded shaft 44 to rotate in the threaded bores 26 and 28. This rotates the valve assembly 30 which is mounted on the threaded shaft 44 causing the valve member 32 to move axially in the chamber 22. When the motor 66 rotates in one direction, the valve member 32 will move leftwardly until the seal 40 engages the left end wall of the chamber 22 which is the closed or inoperative condition of the control device 10. When the motor 66 rotates the valve assembly 30 in the other direction the valve member 32 moves rightwardly in the chamber 22 thereby opening the device 10. In the open position of the valve the seal 42 engages the right end wall of the chamber 22 preventing communication between the chambers 22 and 24. It can therefore be seen that because of the threaded connection between the shaft 44 and the bores 26 and 28 the valve assembly 30 moves axially during operation of the motor 66 and for this reason the leg portions 50 of the U-shaped member 46 must be made long enough so that the member 52 will be able to engage the leg portions 50 in all positions thereof.

The threaded shaft 44 is shown long enough to extend completely through the threaded bores 26 and 28 and the left end of the shaft 44 is provided with a knob 68 which can be rotated manually independently of the motor 66, if desired. This manual control feature is an optional convenience feature and is handy for test purposes and also in the event of a motor failure but it may be eliminated if desired thereby simplifying the construction and eliminating the seal 40, the threaded bore 26 and the knob 68. If these parts are eliminated it will also be impossible to leak fluid through the bore 26.

Referring again to FIG. 1, the housing member 14 is shown provided with an inlet bore or port 70 which communicates with the chamber 22 through an annular beveled restriction 72. The outer end of the bore 70 is threaded to receive a fitting 74, and a ball valve member 76 is positioned in the bore 70 and is biased by spring 78 into sealing engagement with the beveled restriction 72 in the closed or inoperative position of the device. When the valve assembly 30 is moved rightwardly to its open position by operation of the motor 66 (or by rotating the knob 68) the beveled surface 38 on the valve member 32 engages the ball member 76 moving it out of engagement with the restriction 72 thereby establishing communication between the port 70 and the chamber 22.

A second port 80 is also formed in the housing portion 14 and communicates with the chamber 22. The port 80 has a threaded portion which receives another fitting 82 that is connected to a conduit 84, the purpose for which will be described later. When the ball valve 76 is unseated the port 80 will communicate with the port 70. A third port 86 is provided in the housing portion 16 and one end of the port communicates with the chamber portion 24. The opposite end of the port 86 is threaded to receive another fitting 88 which is connected to another conduit 90.

When the control device 10 is in its closed position, which is the position illustrated in FIG. 1, the ball member 76 will be seated on the restriction 72 and the port 70 cannot then communicate with the chamber 22. However, the diameter of the portion 36 of the valve member 32 being smaller than the diameter of the chamber 22, permits communication between the ports 80 and 86. By the same token, when the valve member 32 is in its rightmost position (FIG. 1) which is the open position of the valve member, the seal 42 will engage the right end wall of the chamber 22 to prevent communication between the chambers 22 and 24 and between the ports 80 and 86. In this position, however, the ball valve member 76 will have been unseated from the beveled restriction 72 in the port 70 by the action of beveled surface 38 and communication will be established between the inlet port 70 and the port 80.

FIG. 2 shows the controls for an automobile air conditioning system which includes a control device 10 constructed as shown in FIG. 1. Lubricating pump 92 for the automobile engine has its outlet connected by conduit 94 to the fitting 74 which communicates with the valve inlet port 70, and the inlet side of the pump 92 is connected by another conduit 96 to an oil sump or crankcase 98. The valve port 86 is in the lubricant return line and is connected to the oil inlet or low pressure or atmospheric side of the crankcase 98 by the conduit 90. The low pressure side of the engine crankcase is the low pressure side of the air conditioning control means.

The conduit 84 connected to the fitting 82 at port 80 has its opposite end connected to a plurality of system operating elements including pressure operated switches 100 and 102, a carburetor fast idle control device 104, and a hydraulic clutch device 106. The pressure operated switch 100 is a normally closed switch which opens when the engine pump pressure is applied thereto from the pump 92 by way of the control device 10. The pressure operated switch 102 is a normally open switch and its contacts close when the same pressure is applied thereto. The fast idle control 104 is shown as including a chamber 108 divided by a diaphragm 110 which engages a movable plunger member 112. When the engine pump pressure is applied against the diaphragm 110, the diaphragm moves the plunger 112 in a direction to increase the engine idling speed. This is done to increase the engine speed so that the engine will operate the air conditioning system at idling speeds without killing and without placing an excessive load on the engine. This also prevents the engine from killing at stop signs as well as at other times when the engine is idling.

The clutch 106 is also operated off the pressure from the pump 92 when the control device 10 is open. When pressure is applied to the clutch, the clutch becomes engaged and couples the engine to a compressor 114 which is an essential part of the air conditioning system. It can therefore be seen that when the control device 10 is in its open or operating position, which is when the valve assembly 30 is in its rightmost position (FIG. 1), the pressure from the engine lubricating pump 92 will be fed through the device 10 to operate the elements 100, 102, 104 and 106. This will increase the engine idling speed, couple the engine to drive the compressor 114, open the contacts of the normally closed switch 100, and close the contacts of the normally open switch 102. When the device 10 is in its inoperative position, on the other hand, all of the above named elements will also be in their inoperative conditions, and the communication established between the ports 80 and 86 will operate to relieve any pressures that exists on the downstream side of the device 10.

It is important to the operation of the present system to control the energizing and deenergizing of the motor 66 and at the same time control the direction in which the motor rotates when energized. This is done by a control circuit which is shown in FIG. 2 and which includes relay 116. The relay 116 draws relatively little current compared to magnetic clutch devices which have been used heretofore and which it replaces in existing engine driven air conditioning systems, and this is an important advantage of the present system because this feature means that the present system can be operated even over long periods of time without producing substantial drain on the electrical system.

The relay 116 includes a relay coil 118, which has one side grounded and the opposite side connected by lead 120 to a thermostatic control device (not shown). The thermostatic control device controls the energizing and deenergizing of the relay coil 118 and hence also the energizing and deenergizing of the motor 66. When the relay coil 118 is energized by the closing of contacts in the thermostat, the system goes into a cooling cycle. Under these conditions the relay armature 122 moves toward the relay core 123 and in so doing moves movable relay contacts 124 and 126 into engagement respectively with stationary relay contacts 128 and 130. This establishes a circuit from battery 132 to and through relay contacts 128 and 124, which are now closed, to terminal 66b on the motor 66 through the motor windings to motor terminal 66a, then by lead 129 to and through the closed relay contacts 126 and 130 to lead 134, then to and through the normally closed contacts of the pressure operated switch 100 which are at this time closed and finally to ground. This circuit energizes the motor 66 in a direction to rotate the valve assembly 30 and cause it to move from its leftward inoperative position to its rightward or operative position. In so doing, the tapered surface 38 on the valve member 32 moves against and unseats the ball valve member 76 to allow the pressure on the outlet side of the pump 92 to be fed into the conduit 84 and to the elements 100, 102, 104 and 106 as aforesaid. As soon as the pressure operates the switch 100 to open it, the motor 66 will be deenergized because the switch is in the motor circuit. This should take place after the seal 42 is seated on the right end wall of the chamber 22. At the same time that contacts of the pressure switch 102 close in preparation for reenergizing the motor in the opposite direction when the thermostat contacts open to denergize the relay 116. At the same time the pressure will also be used to operate the fast idle speed contact 104 and the clutch 106 to engage and drive the compressor 114. Air conditioning will now take place and will continue as long as the thermostat maintains the relay coil 118 in an energized condition.

When the desired temperature condition has been reached, the contacts of the thermostat will open the circuit to the relay coil 118 and deenergize the relay 116. When this happens the movable relay contacts 124 and 126 will move out of engagement with the stationary relay contacts 128 and 130 and will return to their deenergized positions engaging other stationary relay contacts 136 and 138, respectively. Remembering that the control device 10 is still open, a circuit will now be established from the positive side of the battery 132 through the relay contacts 138 and 126 to the motor terminal 66a (instead of motor terminal 66b as in the first case) through the motor in the opposite direction from previously, through the relay contacts 124 and 136 and finally to and through the normally open contacts of the pressure switch 102 (which are now closed because the device 10 is open) to ground. The motor 66 will now be energized to rotate the valve assembly 30 in the opposite direction to move it leftwardly in the chamber 22 to its deactivated position thereby again allowing the ball valve member 76 to reengage the tapered restriction 72 to cut off communication between the engine pump 92 and the elements 100, 102, 104 and 106. At the same time communication will be reestablished between the ports 80 and 86 past the right end portion 36 of the valve member 32 to relieve any pressure that may exist in the conduit 84, and to allow the pressure operated elements to return to their normal deenergized conditions. As soon as the normally open pressure switch 102 returns to its normal state its contacts will open to again deenergize the motor 66. The system is now returned in its deactivated condition and will remain so until the thermostat again operates to energize the relay 116 and repeat the air conditioning cycle.

An important feature of the present invention resides in the fact that it requires very little current to operate and to maintain in operating condition. This is primarily true because of the fact that the valve assembly is moved by rotation of a threaded member which is so constructed that it will remain in both of its operating positions without requiring any holding power or source of holding energy. For example, the present system can be maintained in its air conditioning cycle with only sufficient power to maintain the relay 116 in its energized condition. In its deenergized condition no energy is required. In an actual test made of the subject device installed in an automobile the system consumed only about 90 milliwatts of power or less during the air conditioning cycle as compared to more conventional systems which include magnetic clutches that draw currents of the order of 30 watts or more during air conditioning. Even the motor 66 in the test model operated with as little energy as 15 watts and less and its operating cycles were of very short duration. The power requirements of the present system are therefore substantially less than for any known systems thereby providing much less drain on the electrical system of the vehicle on which it is installed. Furthermore, the present system for the most part, uses well known readily available parts and engine components, many of which are already in the automobile, and the control device 10 itself can be constructed relatively inexpensively and can be installed in many different places in the vehicle since it does not have any mechanical linkages or connections with the existing engine parts.

It should also be noted that the seal member 40 helps to prevent the escape of engine lubricant between the threaded member 44 and the threaded bore 26 when the valve assembly 30 is in its inoperative left position and when it is provided with the manual control feature.

The provision of loose coupling between the motor 66 and the threaded shaft 44, which is provided by the members 46 and 50, also has certain advantages in the present device because it enables the motor to build-up speed for approximately 160° of revolution before becoming engaged with the shaft 44. This better enables the motor to break any seal that may exist between the seals 40 and 42 and the adjacent housing surfaces and provides limited free wheeling motion for the motor during start up for a short distance before encountering load. The provision of a planetary gear arrangement is also preferred, but optional, and is included to increase the motor torque as a result of the inertia effect of the armature at its maximum r.p.m. as compared to its effective torque under load r.p.m. It is also to be noted that slightly more torque is required when moving the valve assembly rightwardly than leftwardly because during rightward movement the assembly must also unseat the ball valve member 76. The planetary gears 60 and their carrier 58 also rotate at a slower speed but at greater torque than the sun gear 62 which is a condition that is desired.

As mentioned, the manual control feature provided by the knob 68 on the left end of the threaded shaft 44 is an optional feature which has proven handy for test purposes. However, this feature can be eliminated and in so doing will eliminate one point of possible fluid loss and will also reduce the cost of the device. It is also contemplated and preferred to construct the entire control device 10 as a compact unit.

It is important to the invention that the subject device and system are able to operate in conjunction with existing pressure sources in an automobile, airplane, boat or other engine driven device without requiring its own source of pressure and without producing any substantial additional drain on the existing pressure source. Furthermore, the subject device and system can operate on air as well as hydraulic pressure and the means for producing the pressure can include the pumps, regulators, sumps, reservoirs and other means already in the vehicle. For example, the pressure source can be an existing lubricating oil pressure source, the pressure derived from an automatic transmission, the pressure produced in a power steering device and so on. On vehicles equipped with air pressure systems the pressure for the air brakes and other pneumatic device can be used instead. It can therefore be seen that the subject means can utilize almost any existing pressure source and the only additional requirement for its operation is the relatively small electric power required which is of the order to 90 milliwatts or less as mentioned above.

Thus there has been shown and described a novel control device particularly adapted for controlling air conditioning equipment installed in vehicles such as automobiles, airplanes, boats and so on and particularly where the air conditioner is operated by an engine, and a novel system in which the subject control device is used, which control device and system fulfill all of the objects and advantages sought therefor. Many changes, modifications, variations and other uses and applications of the subject control and system will, however, become apparent to those skilled in the art after considering this specification and the accompanying drawing which discloses a preferred embodiment thereof. All such changes, modifications, variations, and other uses and applications which do not depart from the spirit and scope of the invention are deemed to be covered by the invention which is limited only by the claims which follow.

What is claimed is:

1. Control means for engine driven air conditioners and the like comprising a control valve including a housing with a chamber therein, a main valve member movable in said chamber between first and second operating positions, first, second and third ports communicating at spaced locations with said chamber, normally closed valve means including a second movable valve member associated with said first port, said main valve member including means for controlling communication between said second and third valve ports and other means engageable with said second movable valve member to control communication between said first and second ports, motor means operatively connected to said main valve member including means for selectively energizing said motor means to move the main valve member between the first operating position thereof in which it engages the second movable valve member to establish communication between the first and second ports and then simultaneously prevents communication between the second and third ports, and said second operating position in which the main valve member is out of engagement with said second valve member and is positioned in the chamber establishing communication between the second and third ports.

2. The control means of claim 1 wherein said main movable valve member includes means threadedly engageable with the valve housing, said motor means including means for selectively rotating said main movable valve member relative to the housing to move said member in the housing chamber between said first and second operating positions.

3. The control means defined in claim 2 wherein said motor means includes a reversible electric motor, a source of electric energy, means operatively connecting the motor means to the main valve member, and means selectively controlling the polarity of electric energy from said source applied to the motor means to control the direction of operation thereof.

4. The control means defined in claim 3 including temperature responsive circuit means for controlling the application of electric energy to the electric motor.

5. The control means defined in claim 3 including pressure responsive circuit means for controlling the polarity of electric energy applied to the electric motor.

6. Control means for an engine driven air conditioning system including an engine and a source of engine oil pressure, compressor means and pressure responsive clutch means for selectively coupling the compressor means to the engine, the improvement comprising valve means for controlling the application of engine oil pressure to the clutch means, said valve means including a valve housing having a valve chamber therein, a first connection between the valve chamber and the engine oil pressure source, a second connection between the valve chamber and the clutch means, a third connection between the valve chamber and the engine crankcase, a valve member movable in the valve chamber including a first valve portion for controlling communication between the engine oil pressure source and the clutch means and a second portion including means for controlling communication between the clutch means and the engine crankcase, motor means for selectively moving said valve member in the valve chamber between said first and second operating positions, the first position of said movable valve member establishing communication between the first and second connections to communicate the engine oil pressure source and the clutch means, the second position of said movable valve member establishing communication between the second and third connections to communicate the clutch means to the engine crankcase, and means for selectively energizing said motor means to move said valve member between the first and second operating positions, said motor energizing means including a source of electric energy and circuit means including means responsive to temperature for applying said electric energy to the motor means, and means responsive to pressure to control the polarity of the energy applied to the motor means and hence also the direction of operation of the motor means and the direction of movement of the valve member in the valve chamber.

7. The control means defined in claim 6 wherein said motor energizing means includes relay means and means for energizing said relay means in response to a predetermined condition of a temperature being controlled.

8. The control means defined in claim 6 wherein said motor energizing means includes pressure actuated switch means connected to respond to the pressure applied to the clutch means.

9. The control means defined in claim 6 wherein said first connection to the valve chamber includes normally closed valve means, said movable valve member including means engageable with said normally closed valve means to control the operation thereof.

10. An air conditioning system for an engine driven vehicle comprising a compressor, clutch means responsive to the application thereto of engine pressure to couple the compressor to the engine, and means for controlling the application of engine pressure to the clutch means in response to the temperature of a condition being cooled, said control means including valve means having a valve chamber with a first connection to a source of engine pressure, a second connection to the clutch means and a third connection to the engine crankcase, a valve member movable in said chamber including first valve means for controlling communication between the first and second connections, and second valve means for controlling communication between the second and third connections, motor means operatively connected to said valve member and selectively energizable to move said valve member between a first position in said chamber in which the first valve means is positioned preventing communication between the first and second connections and said second valve means is positioned establishing communication between said second and third connections, and a second position in which the first valve means is positioned to establish communication between said first and second connections and said second valve means is positioned preventing communication between said second and third connections.

11. The air conditioning system defined in claim 10 wherein said movable valve member has a threaded connection with the valve housing and said motor means includes means for rotating said movable valve member in selected directions to produce displacement thereof in the valve chamber.

12. The air conditioning system defined in claim 10 including normally closed valve means associated with said first connection, said movable valve member including means engageable with said normally closed valve means to control the opening and closing thereof.

13. The air conditioning system defined in claim 10 wherein said motor means is an electric motor capable of being operated selectively to rotate in both directions depending on the polarity of the voltage applied thereto, circuit means for energizing said motor means including a voltage source, relay means and switch means connected to selectively control the application and polarity of the voltage applied to the electric motor, said switch means including pressure actuating means connected to respond to the pressures applied to the clutch means.

14. The air conditioning system defined in claim 10 including means for manually moving the valve member in the housing chamber.

15. The air conditioning system defined in claim 10 including engine speed control means including means connected to respond to the pressures applied to the clutch means.

References Cited

UNITED STATES PATENTS

| | | | |
|---|---|---|---|
| 2,333,913 | 11/1943 | Beam | 137—612.1 XR |
| 2,807,146 | 9/1957 | Jackson | 62—243 XR |
| 3,037,526 | 6/1962 | Wheeler | 137—609 XR |
| 3,289,431 | 12/1966 | Haley | 62—323 XR |

MEYER PERLIN, *Primary Examiner.*